United States Patent
Meyer et al.

(10) Patent No.: US 9,483,872 B2
(45) Date of Patent: Nov. 1, 2016

(54) GRAPHICAL REPRESENTATION OF ROADS AND ROUTES USING HARDWARE TESSELLATION

(71) Applicant: ELEKTROBIT AUTOMOTIVE GmbH, Erlangen (DE)

(72) Inventors: Quirin Meyer, Putzbrunn (DE); Mario Poerner, Nuremberg (DE)

(73) Assignee: ELEKTROBIT AUTOMOTIVE GmbH, Erlangen (DE)

( * ) Notice: Subject to any disclaimer, the term of this patent is extended or adjusted under 35 U.S.C. 154(b) by 0 days.

(21) Appl. No.: 14/721,583

(22) Filed: May 26, 2015

(65) Prior Publication Data

US 2015/0348318 A1    Dec. 3, 2015

(30) Foreign Application Priority Data

May 27, 2014    (DE) .................. 10 2014 007 914

(51) Int. Cl.
*G06T 17/20* (2006.01)
*G01C 21/26* (2006.01)
(Continued)

(52) U.S. Cl.
CPC .............. *G06T 17/20* (2013.01); *G01C 21/26* (2013.01); *G06T 7/0089* (2013.01);
(Continued)

(58) Field of Classification Search
USPC .............. 701/469, 532; 340/990; 73/178 R; 345/418, 419, 423
See application file for complete search history.

(56) References Cited

U.S. PATENT DOCUMENTS 4,758,959 A * 7/1988 Thoone .................. G01C 21/30
340/990
(Continued)

FOREIGN PATENT DOCUMENTS

DE         200 22 813 U1    5/2002
DE    10 2004 030 709 A1    1/2006
(Continued)

OTHER PUBLICATIONS

A Precise Road Network Modeling and Map Matching for Vehicle Navigation ; Chenhao Wang; Zhencheng Hu; Uchimura, K. Intelligent Transportation Systems, 2008. ITSC 2008. 11th International IEEE Conference on;Year: 2008 pp. 1084-1089, DOI: 10.1109/ITSC.2008.4732642.*

(Continued)

*Primary Examiner* — Cuong H Nguyen
(74) *Attorney, Agent, or Firm* — Westerman, Hattori, Daniels & Adrian, LLP

(57) ABSTRACT

A technical solution is provided for graphical representation of road segments by employing hardware tessellation, wherein cartographic data that describe at least one two-dimensional or three-dimensional road contour of the road segment are assigned to each road segment. One method aspect comprises the steps of piecewise partitioning the parametrization of the road segment into mutually independent curve segments, of providing at least one tessellation factor for each curve segment, the at least one tessellation factor specifying into how many subsegments each curve segment is to be subdivided in the direction of the road contour, of generating a tessellation pattern for each curve segment based on the at least one tessellation factor, and of generating primitives, capable of being represented on a screen, on the basis of the generated tessellation pattern and on the basis of the parametrized road contour.

24 Claims, 7 Drawing Sheets

(51) Int. Cl.
*G06T 7/00* (2006.01)
*G06T 11/20* (2006.01)
*G06T 17/05* (2011.01)

(52) U.S. Cl.
CPC .......... *G06T 11/203* (2013.01); *G06T 11/206* (2013.01); *G06T 17/05* (2013.01); *G06T 2200/28* (2013.01); *G06T 2207/30184* (2013.01)

(56) References Cited

U.S. PATENT DOCUMENTS

| | | | | |
|---|---|---|---|---|
| 4,821,214 | A * | 4/1989 | Sederberg | G06T 19/20 345/420 |
| 6,600,485 | B1 | 7/2003 | Yoshida et al. | |
| 7,450,118 | B2 * | 11/2008 | Cho | G06T 17/20 345/419 |
| 8,044,955 | B1 | 10/2011 | Yhann | |
| 8,212,807 | B2 * | 7/2012 | Ingersoll | G06T 15/04 345/419 |
| 8,379,016 | B2 * | 2/2013 | Ingersoll | G06T 15/04 345/419 |
| 8,493,378 | B2 * | 7/2013 | Phillips | G06F 17/30241 345/418 |
| 8,605,085 | B1 | 12/2013 | Moreton | |
| 2006/0050071 | A1 * | 3/2006 | Fenney | G06T 17/30 345/419 |
| 2007/0018988 | A1 | 1/2007 | Guthe | |
| 2007/0087756 | A1 * | 4/2007 | Hoffberg | G06Q 10/0631 455/450 |
| 2007/0091086 | A1 * | 4/2007 | Fenney | G06T 17/30 345/423 |
| 2008/0273034 | A1 * | 11/2008 | Fenney | G06T 17/30 345/423 |
| 2009/0058854 | A1 * | 3/2009 | Ingersoll | G06T 15/04 345/427 |
| 2009/0237401 | A1 | 9/2009 | Wei et al. | |
| 2010/0082248 | A1 | 4/2010 | Dorum et al. | |
| 2010/0214294 | A1 | 8/2010 | Li et al. | |
| 2010/0289802 | A1 | 11/2010 | Falchetto | |
| 2012/0320090 | A1 * | 12/2012 | Phillips | G06F 17/30241 345/629 |
| 2012/0330869 | A1 * | 12/2012 | Durham | G06N 5/022 706/16 |
| 2013/0321422 | A1 | 12/2013 | Pahwa et al. | |
| 2014/0043330 | A1 | 2/2014 | Ceylan et al. | |

FOREIGN PATENT DOCUMENTS

| | | | | |
|---|---|---|---|---|
| DE | 698 30 124 T2 | 1/2006 | | |
| DE | 10 2007 009 640 A1 | 9/2008 | | |
| DE | 10 2010 048 760 A1 | 7/2011 | | |
| JP | 2010537349 W | * 12/2010 | | G06T 19/00 |
| WO | WO 2009032692 A1 | * 3/2009 | | G06T 15/04 |

OTHER PUBLICATIONS

Satellite image based topological map building method for intelligent mobile robots ;Yu-Cheol Lee; Christiand; Wonpil Yu; Sunghoon Kim;Intelligent Vehicles Symposium (IV), 2012 IEEE ;Year: 2012; pp. 867-872, DOI: 10.1109/IVS.2012.6232295.*

Vehicle self-localization with high-precision digital maps;Schindler, A; Intelligent Vehicles Symposium Workshops (IV Workshops), 2013 IEEE; Year: 2013; pp. 134-139, DOI: 10.1109/IVWorkshops.2013.6615239.*

A Multi-Weights Map Matching algorithm used in GPS system for vehicle navigation application; Yiran Zhang; Chengjun Guo; Ruizhao Niu; Yanling Mao;Signal Processing (ICSP), 2014 12th International Conference on ; Year: 2014; pp. 2375-2378, DOI: 10.1109/ICOSP.2014.7015419.*

DMAP: Density Map Service in City Environments ; Pratap Kumar Sahu; Abdelhakim Hafid; Soumaya Cherkaoui; IEEE Transactions on Intelligent Transportation Systems; Year: 2015, vol. 16, Issue: 5; pp. 2862-2877, DOI: 10.1109/TITS.2015.2430365.*

A robust Hough transform technique for description of multiple line segments in an image; V. Kamat; S. Ganesan Image Processing, 1998. ICIP 98. Proceedings. 1998 International Conference on; Year: 1998, vol. 1 pp. 216-220 vol. 1, DOI: 10.1109/ICIP.1998.723460.*

German Search Report dated Jan. 27, 2015, issued in corresponding application No. DE10 2014 007 914.7, (12 pages).

Wilkie, et al., "Transforming GIS Data into Functional Road Models for Large-Scale Traffic Simulation", IEEE Transactions of Visualization and Computer Graphics, vol. 18, No. 6, Jun. 2012, pp. 890-901, cited in German Search Report.

* cited by examiner

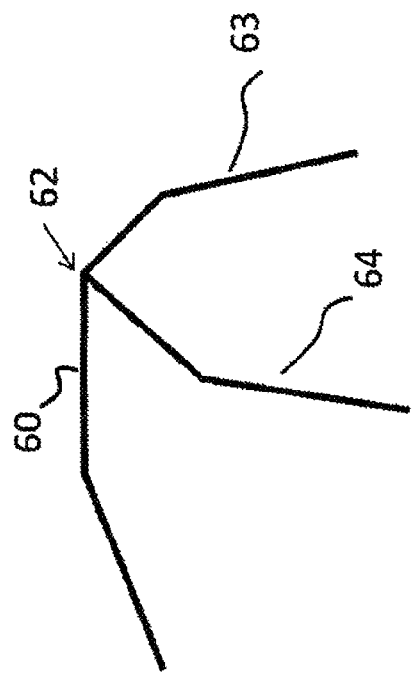
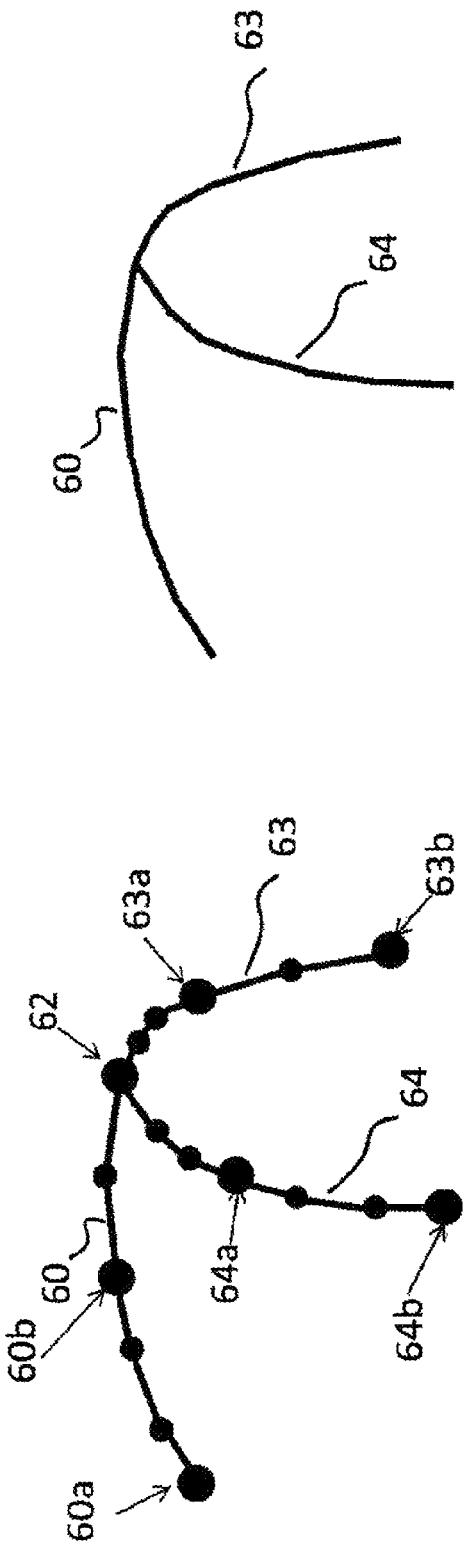
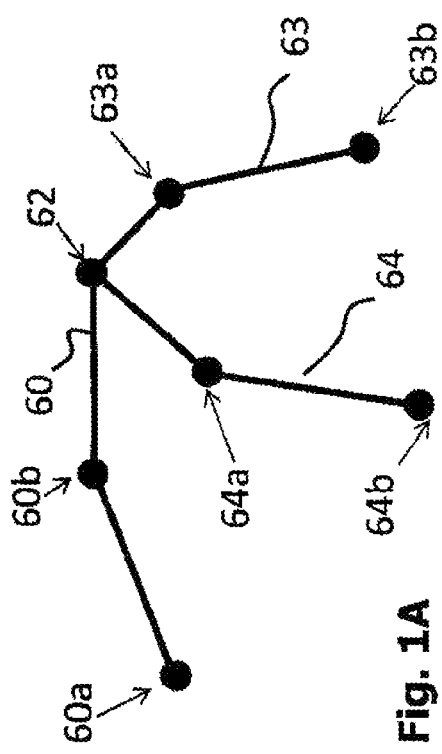
Fig. 1A
Fig. 1B

GRAPHICAL REPRESENTATION OF ROADS AND ROUTES USING HARDWARE TESSELLATION

The present disclosure relates generally to the representation of cartographic data using hardware tessellation. In concrete terms, a solution is specified for graphical representation of road segments on the basis of cartographic data that describe at least one two-dimensional or three-dimensional road contour of the road segments.

BACKGROUND

Digital map data include, as a rule, road-edge data and road-node data, in order to reproduce a road network. A road edge represents, within the road network, a road segment between two successive intersections or junctions. A road node represents an intersection or a junction in the road network.

The graphical representation of a road network consists substantially in the concrete visual reproduction of the road contour of individual roads of the road network. A similar statement applies to the representation of a calculated route in the course of a route-calculation function in which the road contour of the calculated route is represented (wholly or piecewise). The road contour describes the curve contour of roads, road segments or routes within a cartographic coordinate system.

For the purpose of describing the road contour, so-called shape points have been saved in the digital map data. Each road segment (or each road edge) has in this case been associated with a succession of shape points that describe the curve contour of the road segment. Each shape point represents a position with respect to a cartographic coordinate system (e.g. geographical longitude and geographical latitude).

In current representation methods, use is made of the shape points assigned to the road segments or routes for the purpose of graphical representation of road segments or routes. The road contour is represented in accordance with the positions of the shape points, the road contour being linearly interpolated between respectively adjacent shape points.

An example of such a graphical representation of road segments by means of linear interpolation between adjacent shape points are shown in FIG. 1A and FIG. 1B. FIG. 1A shows a detail of a road network consisting of the road segments 60, 63, 64, which each terminate at the node 62. Since the road segments exhibit a strong curvature, the curve contours linearly interpolated between the shape points 60*a*, 60*b*, 63*a*, 63*b*, 64*a* and the nodal point 62 result in transitions that are angular and not smooth. As is immediately evident from the right-hand representation shown in FIG. 1A, striking transitions arise at points 60*b*, 62, 63*a*, 64*a*, which reproduce the real curve contour in greatly distorted manner.

One possible way to make the curve contour appear smoother consists in providing further shape points, in order to reduce further the spacings of adjacent shape points, as has been represented schematically in the left-hand drawing shown in FIG. 1B. In this connection, additional shape points (represented by the small circles) were inserted between the existing shape points 60*a*, 60*b*, 63*a*, 63*b*, 64*a*, 64*b*. The curve contour can in fact be represented more smoothly, and consequently more realistically, as is immediately evident from the right-hand representation in FIG. 1B.

The disadvantage of a solution of such a type, however, is that the information to be provided in the map data increases further, as a result of which still more memory space is needed. Furthermore, with increasing number of shape points the processing-time per frame to be represented increases, since in the course of the graphical representation each shape point has to be processed separately. This happens at the expense of the speed of graphical representation. However, a slow graphical representation is not desirable, since, for a liquid representation, map data have to be graphically updated, as a rule, several times per second. For performance reasons, therefore, a smaller number of shape points is chosen, and consequently an inferior quality of the graphical representation of map data is accepted.

BRIEF SUMMARY

The object underlying the present disclosure is therefore to provide an improved graphical representation method that, in particular, further improves the representation of roads and routes.

According to a first aspect of the present disclosure, a computer-implemented method is provided for graphical representation of road segments by employing hardware tessellation, wherein cartographic data that describe at least one two-dimensional or three-dimensional road contour of the road segment are assigned to each road segment. The method comprises in this connection the steps of providing a parametrisation that describes the road contour of a road segment, piecewise partitioning the parametrisation of the road segment into mutually independent curve segments, providing at least one tessellation factor for each curve segment, the at least one tessellation factor specifying into how many subsegments each curve segment is to be subdivided in the direction of the road contour, generating a tessellation pattern for each curve segment based on the at least one tessellation factor, and generating primitives, capable of being represented on a screen, on the basis of the generated tessellation pattern and on the basis of the parametrised road contour.

A road segment may describe a road section or a route section between two successive intersections or junctions of a road network. A road network or a route can consequently be represented graphically by graphical representation of the road segments pertaining to the road network or to the route.

The road contour may describe the curve contour (e.g. the geometrical shape) of a road segment or of a road with respect to a predetermined cartographic coordinate system. In other words, the road contour may reproduce a curviness of a road segment. The curviness of a road segment describes, in a variant, the ratio formed from the angular changes of a road segment in relation to the length of the road segment. When the terrain is taken into account in the map data, the road contour may also be three-dimensional. A curve contour of each road segment can be described by shape points stored in the cartographic data. In concrete terms, each road segment can be described as consisting of a series of shape points. Each shape point is described by its geographical position (longitude, latitude and, where appropriate, altitude) within the cartographic coordinate system.

The graphical representation of road segments or roads may be effected on the basis of vector graphics. Each road segment can in this connection be represented graphically with the aid of primitives. In other words, each road segment can be composed or constructed from primitives. By 'primitives', one understands elementary graphical elements comprising points, lines, triangles, rectangles and/or polygons.

For the purpose of graphical representation, in particular triangles can be employed as primitives, since any area (surface) to be represented is capable of being represented as consisting of triangles. Furthermore, graphics processors (graphical processing units or GPUs) are frequently optimised for the representation of triangular primitives. It will be understood that, instead of triangles, other primitives, such as rectangles for example, may also be used for the graphical representation of road segments.

Each road segment can be composed and represented graphically from the primitives generated for the curve segments. The generation of primitives for the purpose of graphical representation of a road segment depends in this connection on the generated tessellation pattern. The tessellation pattern may specify into how many primitives a parametrised road segment (curve segment) is to be partitioned. Said pattern may also specify which primitives (e.g. triangles) are to be used for the partitioning. The tessellation pattern can consequently establish the degree of partitioning (fine-meshed partitioning with many primitives, or coarse-meshed partitioning with few primitives) and the type of the partitioning (rectangles, triangles, etc.).

The curve contour of each curve segment can consequently be linearly interpolated by the generated primitives. The quality of the interpolation may in this connection depend on the number of primitives generated in the direction of the curve contour. The number of primitives in the direction of the curve contour of the curve segment can be established in this case by the tessellation factor assigned to the road contour.

A tessellation factor assigned to the road contour can be calculated dynamically for each curve segment. In this connection said tessellation factor can be calculated (individually) at least based on the curve contour of each curve segment. Said tessellation factor can be calculated in such a manner that a larger tessellation factor is provided for curve segments with high curviness than for curve segments with low curviness. As a result, it can be ensured that curve segments with high curviness are represented by many primitives in the direction of the road contour, whereas curve segments with low curviness are represented graphically with the aid of few primitives. Through the use of a large tessellation factor (and hence the use of a fine-meshed tessellation), for curve segments with high curviness it can be ensured that the graphical representation by means of primitives interpolates the real curve contour of the curve segment best possible, and a smooth graphical representation of the curve is guaranteed. On the other hand, curve segments with low curviness or almost linear contour need only few primitives in order to obtain a smooth graphical representation of the curve. Consequently, by virtue of the curve-segment-dependent generation of the tessellation factor assigned to the curve contour it can be established with what accuracy of detail each curve segment can be represented graphically.

For the purpose of calculating the tessellation factor assigned to the road contour, the curve contour of the curve segment projected onto a screen (or onto some other optical output medium) may be drawn upon. The projected curve contour may differ, depending on the angle of view, from a real curve contour of a road segment. For example, a curve segment with high real curviness in a lateral viewing mode can be represented approximately linearly on the screen. For a segment of such a type a high accuracy of detail in the graphical representation is not needed, and so a small tessellation factor along the road contour can be provided.

According to one implementation, the tessellation factor assigned to the road contour can be calculated for a curve segment $\vec{F}_i$ parametrised in a parameter interval $[t_i, t_{i+1}]$, in accordance with the equation $u_{tess}=2\times\log(\delta)/\log(\epsilon_0)$, where $u_{tess}$ denotes the tessellation factor, $\delta$ specifies a preset accuracy value, and where $\epsilon_0$ is calculated from a start-point $\vec{S}_0=\vec{F}(t_i)$, an end-point $\vec{S}_2=\vec{F}(t_{i+1})$ and a point $\vec{S}_1=\vec{F}(½(t_i+t_{i+1}))$ of the parametrisation $\vec{F}_i$, by calculating a spacing of a straight line connecting the start-point $\vec{S}_1$ and end-point $\vec{S}_2$ from point $\vec{S}_1$. $\vec{S}_1$, $\vec{S}_2$, and $\vec{S}_3$ may in this connection be values of the parameter curve projected onto screen coordinates. Furthermore, the preset accuracy value $\delta$ may be specified in pixels. Said value may be set to a fraction of a pixel (e.g. half a pixel). It will be understood that the preset accuracy value may also take another value (for example, one pixel).

Alternatively or in addition to the curve-contour-dependent calculation, the tessellation factor assigned to the road contour may also be calculated based on a field of view for the curve segments to be represented. For example, curve segments that are located further away, seen from a viewer, can be tessellated more coarsely (and hence can be represented graphically with lower accuracy of detail) than curve segments in an immediate vicinity of the viewer.

Since roads and routes are represented on the screen not merely as one-dimensional lines but rather as two-dimensional graphical objects with a certain (variable) road width, a further tessellation factor for a direction perpendicular to the road contour (that is to say, along the road width) can be provided. The tessellation factor assigned to the road width may in this connection assume a constant value. The tessellation factor may, for example, take the value 1. In this case, no tessellation (that is to say, no further partitioning into primitives) is effected in the direction of the road width. Of course, according to an alternative variant the tessellation factor may also take another value in the direction of the road width. In both cases the tessellation factor in the direction of the road width does not depend on the curve contour of the curve segments.

The step of generating a tessellation pattern may include the following substep: generation of scan points based on the at least one tessellation factor provided, the generated scan points specifying the degree of subdivision of a curve segment along the road contour. The generating step may furthermore include generating scan points based on the tessellation factor assigned to the road width, which specifies the degree of subdivision of the width of the curve segment. The generating step may furthermore include generating a two-dimensional pattern on the basis of the scan points. The tessellation pattern may consist of triangles, with the scan points forming the vertices of the triangular pattern.

The step of generating primitives that are capable of being represented may include the following substeps: implementing a coordinate transformation that maps the parametrisation of the road contour onto coordinates of the screen space; calculating vertices, by the transformed parametrisation being evaluated at the scan points along the road contour; and generating primitives, capable of being represented graphically, on the basis of the generated vertices.

The step of calculating vertices may furthermore include: calculating vertices, by evaluating the transformed parametrisation at the scan points along the road contour, and by evaluating the vertices provided for the road width along a normal vector that lies in the screen plane and is perpendicular to the road contour.

The step of providing a parametrisation of a road contour for a road segment may include the step of calculating a parametrisation for the road segment on the basis of previously stored shape points marking the road contour. The parametrisation may in this case be calculated in such a manner that the parametrised curve interpolates the shape points. The parametrisation may be calculated on the fly (that is to say, during the graphical representation). But it is also conceivable that the parametrisation is generated in the course of the compilation of the map data and has been saved in the map data.

Alternatively to this, a parametrisation of the road segments may also be provided by a supplier of maps. In this case, providing the parametrisation includes reading-out and uploading of the parametrisations into a working memory or into a graphics memory for further processing.

According to a variant, the parametrisation can be effected with the aid of quadratic B-splines that are described via non-uniformly distributed nodal points and check points, the so-called de Boor points (called 'quadratic NUBS' in the following). The parametrisation of the road contour of a road segment by means of NUBS can be effected on the basis of the shape points provided for the road segment, as already described above. Alternatively to this, the curve parametrisation can also be carried out by means of Bézier curves or cubic NUBS or otherwise.

The step of piecewise partitioning of the parametrisation of the road segment into mutually independent road segments may include partitioning the NUBS describing the road contour of the road segment into mutually independent quadratic polynomials. Each polynomial may in this connection form a smallest unit from which the NUBS describing the road segment is composed. Each polynomial is defined, for example, over a node interval $I_i=[t_i, t_{i+1}]$ of successive adjacent nodes. Said polynomial may represent the local curve contour between two successive nodes. Each polynomial in the interval $I_i$ may in this connection be described completely and uniquely with the aid of a nodal vector $\vec{s}_i=[t_{i-1}, t_i, t_{i+1}, t_{i+2}]$, which comprises merely four nodes, and three de Boor points $\vec{d}_{i-2}, \vec{d}_{i-1}, \vec{d}_i$. The advantage of partitioning the NUBS into piecewise quadratic polynomials is that for each node interval $I_i$ a local representation of the B-spline is possible and each partition can be tessellated independently of adjacent partition. The tessellation and, in particular, the degree of tessellation may in this connection be different for each segment in accordance with its curviness. In this connection an adaptation to the curviness of the polynomial may take place, as already discussed above. In particular, the piecewise partitioning of a B-spline prevents the tessellation of long road segments or route segments from becoming insufficiently fine by reason of hardware-conditioned upper limits for the tessellation.

On the other hand, each road segment can be composed successively by means of the quadratic polynomials provided for the tessellation. The de Boor points $\vec{d}_{i-2}, \vec{d}_{i-1}, \vec{d}_i$ and nodal vector $\vec{s}_i=[t_{i-1}; t_i; t_{i+1}; t_{i+2}]$ capable of being assigned to each quadratic polynomial of a road segment may for this purpose be stored temporarily for further graphical processing (i.e. tessellation and generation of primitives that are capable of being represented graphically) in a working memory, graphics memory or otherwise. The storage can be effected by means of a vertex-attribute array and an index array. The vertex-attribute array may comprise the nodal vectors and the de Boor points for all the quadratic polynomials of the road segment to be represented. The vertex-attribute array may in this connection store the nodal vectors and the de Boor points in accordance with the arrangement $V=[\vec{d}_0, \vec{d}_1, \vec{d}_2, \vec{s}_0, \vec{d}_3, \vec{s}_1, \vec{d}_4, \vec{s}_2, \vec{d}_5, s_3, \ldots, \vec{d}_{n-1}, \vec{s}_{n-3}]$, where n is the number of nodes. Furthermore, the index-attribute array may comprise indices referencing the vertex-attribute-array entries according to the arrangement $I=[(0,1,2,3); (1,2,4,5); (2,4,6,7); (4,6,8,9); \ldots, (2n-6, 2n-4, 2n-2, 2n-1)]$, where n is the number of nodes. The present storage is advantageous, since nodal vectors and de Boor points, which for the purpose of describing adjacent polynomials partly repeat, only have to be stored once, as a result of which memory space is conserved.

According to a second aspect, a computer-program product is provided, comprising program code for implementing the method when the computer-program product is executed on a computer device. The computer-program product may in this connection be stored on a computer-readable recording medium.

According to a third aspect, a graphics module is provided for graphical representation of road segments by employing hardware tessellation, wherein cartographic data that describe at least one two-dimensional or three-dimensional road contour of each road segment are assigned to each road segment, the graphics module comprising: a unit that is configured to provide a parametrisation that describes the road contour of a road segment; a unit that is configured to partition the parametrisation of the road segment into mutually independent curve segments; a unit that is configured to provide at least one tessellation factor for each curve segment, the at least one tessellation factor specifying into how many subsegments each curve segment is to be subdivided in the direction of the road contour; a tessellation unit that is configured to generate a tessellation pattern for each curve segment based on the at least one tessellation factor; and a unit that is configured to generate primitives, capable of being represented on a screen, on the basis of the generated tessellation pattern and on the basis of the parametrised road contour.

The graphics module may furthermore comprise a memory unit that is configured to store at least one index array and one vertex-attribute array, the vertex-attribute array including vertex attributes for the parametrisation of a road segment.

According to a fourth aspect, a navigation system is provided that comprises the aforementioned graphics module and also a screen that is configured to display the generated primitives.

BRIEF DESCRIPTION OF THE DRAWINGS

Further aspects, advantages and particulars of the present disclosure will become apparent from the following description of the embodiments in connection with the Figures. Shown are:

FIGS. 1A/1B graphical representations of road sections and route sections;

DETAILED DESCRIPTION

The present disclosure will be elucidated with the assistance of schematic block diagrams and flow diagrams. The technical teaching underlying these diagrams may be implemented both in hardware and in software or in a combination of hardware and software. Such implementations also include digital signal processors (DSPs), application-specific integrated circuits (ASICs) and other switching or computing components.

The present disclosure relating to the graphical representation of map data, in particular of road segments, will be described in greater detail in exemplary manner within the scope of the OpenGL standard created by the Khronos Group. OpenGL (Open Graphics Library) is a platform-independent and programming-language-independent graphics-programming interface (application programming interface or API for short) which has been provided for graphical representation of complex two-dimensional and three-dimensional objects with the aid of a graphics module (for example, a graphics card or graphics chip). It is consequently a question of a software graphics interface which lies as an abstraction layer between an application program and the graphics module and supports the linking of application programs to the graphics module.

For the purpose of elucidating the present disclosure, therefore, recourse will partly be had in the following to the terminology of OpenGL. It will be understood that the present invention does not depend on the particulars of the graphics interface being used. For example, it is also conceivable that DirectX (more precisely: DirectDraw or Direct3D) or Quartz come into operation by way of software graphics interface.

Figure 2:
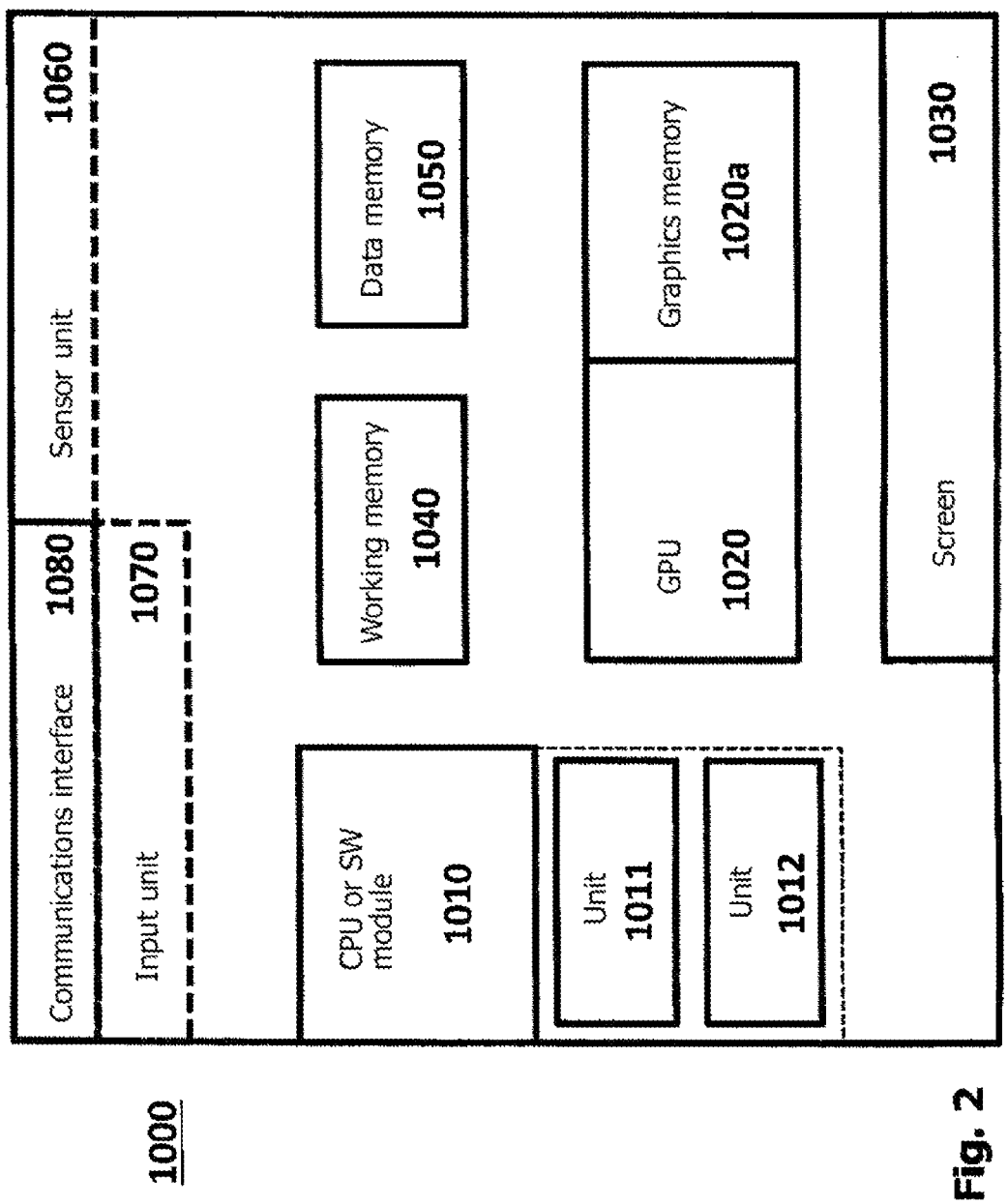
FIG. 2 a block diagram of an apparatus for implementing a method for graphical representation of cartographic data according to an embodiment.

FIG. 2 shows, in the form of a block diagram, an embodiment of an apparatus 1000 for implementing the method described herein for graphical representation of map data, in particular of road segments. The apparatus 1000 may be part of a navigation device (for example, of a portable navigation device (PND) or of a navigation device permanently integrated within a motor vehicle), of a route planner, of a smartphone, of a personal digital assistant (PDA), of a personal computer (PC), of a notebook or of another electronic instrument that is portable or capable of being implemented in a machine (e.g. in a motor vehicle).

The apparatus 1000 includes a core functionality 1010 in the form of a central data-processing unit (central processing unit, CPU) and/or in the form of a software module (SW module), a unit 1011 for generating a parametrisation, a unit 1012 for partitioning the generated parametrisation, a graphics-processor unit 1020 (hereinafter called 'GPU'), a graphics memory 1020a, a screen 1030, a working memory 1040 and a data memory 1050. Optionally in addition, the apparatus 1000 may also include a sensor unit 1060, an input unit 1070 and a communications interface 1080. The optional components of the apparatus 1000 have been indicated in FIG. 2 by dashed lines.

The units 1011 and 1012, the GPU 1020, the graphics memory 1020a, the working memory 1040, the data memory 1050, the sensor unit 1060, the input unit 1070, the communications interface 1080 and the core functionality 1010 are in communicating connection with one another, in order to exchange data to be processed and processed data with one another.

The communications interface 1080 is configured to set up a hard-wired and/or a wireless (e.g. via LTE or GPRS) connection to external devices of a communications network. The apparatus 1000 may exchange data (in both directions) with an arbitrary external device via the communications interface 1080. For example, map data updated via the communications interface 1080 can be retrieved from a map-data server for the purpose of updating map-data material stored in the apparatus 1000. But it is also conceivable that the map data received via the communications interface 1080 are processed further at once for the purpose of graphical representation.

The input device 1070 is configured to accept user inputs in the course of an interaction between a user and the apparatus 1000. User inputs may be data inputs, such as, for example, an input of a start-point, of a destination-point or of an intermediate stop. But user inputs may also be selection operations (e.g. selection of displayed icons, menus or submenus) and control commands which, for example, specify how cartographic data are to be represented on the screen 1030 (e.g. zoom commands or commands with which the perspective for graphical representations is changed). The input may be effected in this connection by actuating input keys, by touching the screen, and/or in speech-based manner. Correspondingly, the input unit may include a touch-sensitive screen, a keyboard, a mouse, a joystick and/or a speech-recognition unit which is able to understand speech inputs and convert them into corresponding control commands.

The sensor device 1060 may include a satellite-based position sensor (e.g. a sensor for receiving GPS signals, Galileo signals and/or Glonass signals), in order to determine the respectively current geographical position of the apparatus 1000. In addition or alternatively to this, the sensor device 1060 may also include relative-position sensors, such as, for example, an odometer and a gyroscope, in order to determine the position of the apparatus 1000. In the case where use is made of relative-position sensors, the absolute position of the apparatus is determined by dead-reckoning principles. The current position is needed, for example, in the course of a navigation.

The data memory 1050 is configured to store cartographic data in digitised form. The cartographic data provided digitally is in this connection organised and structured in a database in accordance with a predetermined format. For example, the Navigation Data Standard map-data format (NDS map-data format for short) may be used by way of map-data format. Alternatively to this, use may also be made of another map-data format. The present solution does not depend on the details of the map-data format.

The stored cartographic data comprise at least road-edge data and road-node data. Road-edge data represent real road segments of a road network between adjacent intersections or junctions. Road-node data represent intersections or junctions as already mentioned in the introduction. Road-edge data and road-node data may be provided with a series of attributes which, for example, reproduce the number of lanes, the width of the roads, the topology of the intersection (e.g. roundabout, T-junction, underpass, overpass, etc.) and the number of roads meeting at the intersection. Attribute information of such a type may be drawn upon in the course of the graphical representation of a road network or of individual roads or intersections, in order to generate a realistic graphical representation.

Furthermore, the cartographic data include shape points that have been assigned to the road edges. As already mentioned in the introduction, the shape points have been provided for establishing the road contour (e.g. the curve contour) of road segments. For this purpose, to each road edge representing a road segment a series of shape points has been assigned which specifies the curve contour (that is to say, the geometrical shape) of the road segment with respect to a geographical coordinate system. In other words, the road contour of each road segment is parametrised by the series of shape points that has been assigned to the road segment. Alternatively or in addition to the shape points, the cartographic data may include concrete curve parametrisations that describe the curve contour of each road segment. In such a case, instead of the shape points the parameter curves may be read out of the data memory, processed, and passed to the GPU 1020 for graphical representation on the screen 1030.

The screen 1030 is configured to make cartographic data available to a user visually. In concrete terms, the screen 1030 displays the cartographic data processed by the GPU 1020. The screen 1030 may take the form of a touch-sensitive screen. In addition to the screen 1030 or alternatively thereto, a projector for outputting the image data made available by the GPU 1020 may be provided.

Unit 1011 is configured to generate a curve parametrisation for road segments or calculated routes on the basis of the stored road-edge data (and road-node data). Unit 1011 can in this connection generate a two-dimensional or three-dimensional parameter curve. According to a variant, unit 1011 is configured to generate a curve parametrisation for road segments on the basis of stored shape points capable of being assigned to the road segments. Each curve parametrisation in this connection reproduces the curve contour (or the curviness) of a road segment. The parametrisation method carried out in unit 1011 on the basis of shape points will be described in greater detail further below with the aid of FIGS. 4 and 5.

According to one implementation, the parametrisation of the road segments may also be dispensed with, provided that the cartographic data already include suitable parametrisations for graphical representation of road segments. In this case the parametrisation of each road segment can be read out directly from the data memory 1050 and passed to the partitioning unit 1012 for further processing.

Unit 1012 is configured to partition the parametrisation generated by unit 1011 (or the curve parametrisations saved in the cartographic data and read out) into a plurality of mutually independent curve segments. The partitioning of parametrisations will be discussed in more detail further below on the basis of FIGS. 4 and 5. The partitioned curves are then passed to the GPU 1020 for graphical representation.

The units 1011 and 1012 may take the form of stand-alone units. But they may also be part of the core functionality 1010, as indicated by the dashed line in FIG. 2. Furthermore, the core functionality may be provided for image calculation of further graphical objects, such as, for example, POIs, three-dimensional urban models, etc., provided that objects of such a type are to be represented on the screen 1030 together with the road segments or routes (and provided that the cartographic data include information of such a type). The core functionality 1010 calculates the vertices of the objects to be represented and passes them to the GPU 1020 for graphical representation. In computer graphics a point of an object to be represented is designated as a vertex. This point may be associated with a set of attributes which comprise, for example, position information (with respect to a predetermined global coordinate system), normal-vector information, texturing information, etc.

The graphics memory 1020a is configured as a stand-alone memory, independent of the working memory 1040. Said memory has been provided for buffering graphics data (graphics frames) to be displayed and/or for buffering vertex data provided by the core functionality 1010 and/or by unit 1012. In an alternative configuration, the graphics memory 1020a may also be a part of the working memory 1040.

The GPU 1020 is configured to control the graphical output of cartographic data on the screen 1030. In concrete terms, the GPU 1020 is configured to calculate a screen output on the basis of the image data (vertex data) provided by the core functionality 1010 and/or unit 1012. For this purpose the GPU 1020 implements a plurality of graphics functions which are drawn upon for graphical representation of objects and which will be described in still more detail in connection with FIG. 3. Furthermore, the GPU 1020 includes a tessellation unit that is configured to implement tessellation functions as specified by standard OpenGL 4.0 (or higher versions) or similar graphics APIs, such as, for example, Direct3D 11.

Figure 3:
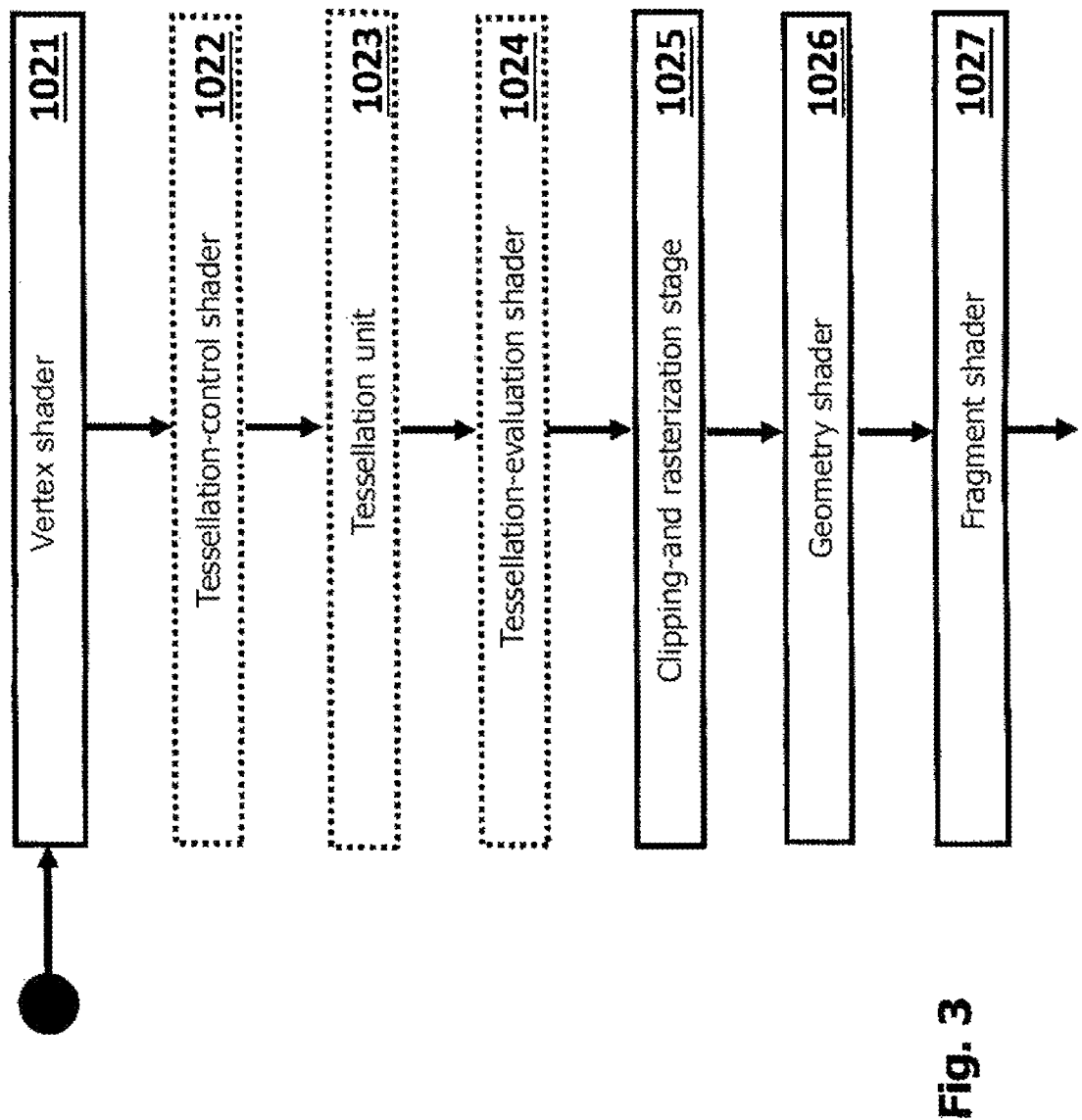
FIG. 3 a further block diagram, which shows an implementation of a hardware-tessellation functionality within a graphics pipeline.

The mode of operation of the GPU 1020 will now be elucidated in greater detail on the basis of FIG. 3 and the graphics pipeline represented therein. By 'graphics pipeline' (frequently also designated as 'rendering pipeline') in the field of computer graphics one understands a succession of graphics-processing steps by which graphics functions implemented in the graphics processor are executed or processed, in order to represent a graphical object graphically on a screen 1030 or on another visual output medium.

As is evident from the simplified graphics-pipeline representation in FIG. 3, the GPU 1020 implements several shaders and also a tessellation unit. A shader is a programmable hardware module or software module which implements certain functions or effects of the graphical representation (rendering effects) within the graphics pipeline. For example, shaders can be programmed to generate 3D effects. Conformity and drive of the individual shaders are effected in this connection by a graphics-programming interface (graphics API, such as OpenGL for example) which represents an abstraction layer between GPU 1020 and application program.

In concrete terms, the graphics pipeline comprises a vertex shader 1021, a clipping-and-rasterization stage 1025, an optionally provided geometry shader 1026 and also a fragment shader 1027. Furthermore, the GPU 1020 includes a tessellation unit 1023, provided for implementing a tessellation function, a tessellation-control shader 1022 and a tessellation-evaluation shader 1024.

The functions of the vertex shader 1021 (e.g. coordinate transformation of individual vertices), of the clipping-and-rasterization stage 1025, of the geometry shader 1026 and of the fragment shader 1027 correspond respectively to the functions of the corresponding shader in graphics pipelines of earlier OpenGL versions and are sufficiently well-known to a person skilled in the art. They will therefore not be elucidated any further. With OpenGL 4.0 (and higher versions) the tessellation-control shader 1022, the tessellation unit 1023, and the tessellation-evaluation shader 1024 are newly introduced into the OpenGL graphics pipeline. Their functions will be described in greater detail in the following.

The programmable tessellation-control shader 1022 is arranged in the graphics pipeline between vertex shader 1021 and tessellation unit 1023. The tessellation-control shader 1022 has been designed to provide a tessellation factor for a patch. A 'patch' in this connection designates a new type of primitive, which was introduced into the graphics pipeline in connection with the implementation of the tessellation functionality. A 'patch' designates a collection (provided by the vertex shader) of vertices that represent a graphical element. The tessellation factor provided by shader 1022 specifies into how many subunits (subsegments) a patch is to be partitioned by the following tessellation unit 1023.

Besides the tessellation factor, in the tessellation-control shader 1022 further tessellation parameters are made available which, for example, establish the type of the tessellation (e.g. partitioning of the patches into triangular primitives or rectangular primitives) and a (two-dimensional) domain for the tessellation, whereby the domain may be rectangular or triangular (barycentric). Through the choice of a particular domain a coordinate system for the tessellation is established, an external tessellation factor being provided for each coordinate. Furthermore, internal tessellation factors can be provided for the domain, which specify how the domain is tessellated in the inner region.

For the tessellation of curve segments in accordance with the present disclosure, a rectangular domain is chosen, and the inner tessellation factor is equated with the external tessellation factor (in the following, called only 'tessellation factor'). The provision of a curve-segment-dependent tessellation factor will be described in more detail further below in connection with FIG. 7.

The non-programmable tessellation unit 1023 is configured to generate a tessellation pattern on the basis of the tessellation factors and tessellation parameters established in the tessellation-control shader 1022. In concrete terms, the tessellation unit 1023 generates scan points and establishes how the scan points are connected to one another in order to generate a tessellation pattern.

The programmable tessellation-evaluation shader 1024 is configured to calculate vertex positions for the scan points on the basis of the tessellation pattern (that is to say, scan points and type of the connection of the scan points) provided by the tessellation unit 1023 and on the basis of the attributes of the patch (location coordinates, normal vector, etc.). In particular, the tessellation-evaluation shader 1024 is also configured to provide interpolated attributes for the vertex positions.

Figure 4:
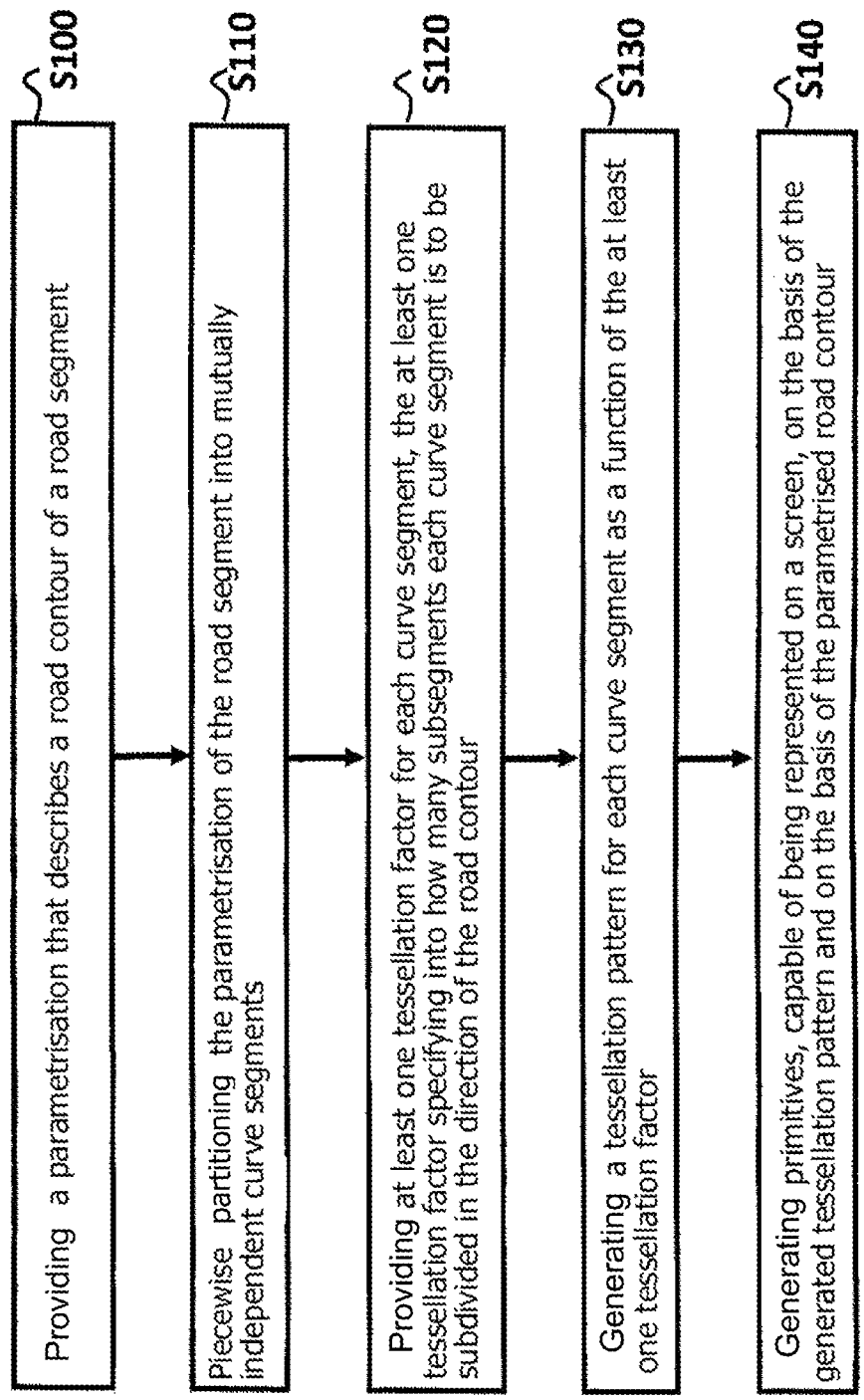
FIG. 4 a flow diagram of a method for graphical representation of road segments with the aid of a hardware-tessellation functionality according to a further embodiment.

With the aid of FIG. 4, an embodiment of a method for graphical representation of road segments by employing the hardware tessellation described above will now be elucidated in greater detail.

According to a first step S100, by means of unit 1011 a parametrisation is provided that describes the road contour of a road segment to be represented on the screen 1030. The parametrised curve reproduces the real road contour (that is to say, the curve contour) of the road segment. The providing comprises generating a suitable parametrisation of the road segment to be represented graphically on the basis of the shape points assigned to the road segment (and on the basis of the road-node data capable of being assigned to the road segment). The calculation of the parametrisation can be calculated for each road segment immediately (so to speak, on the fly) after loading of the shape points (into the working memory 1040). A suitable and resource-sparing parametrisation that can be executed during the graphical representation method will be described in more detailed manner in connection with FIG. 5.

Alternatively to this, the parametrisation of the road contour may be provided in advance by a supplier of map data. In this case the providing comprises merely a read-out and loading of the parametrisation (or of the parameters describing the parametrisation) into the working memory 1040. The data stored temporarily in the working memory 1040 can then be supplied to the partitioning unit 1012 for further processing.

In a further step S110, by means of unit 1012 the parametrised road contour of the road segment is partitioned into mutually independent curve segments. The partitioning can be effected in this connection as a function of the parametrised curve contour along the road segment. In concrete terms, the partitioning of the parametrised road contour of a road segment can be effected in such a manner that a local curve contour of the road segment within a predetermined parameter interval corresponds to each curve segment. The predetermined parameter interval may have been established respectively via two successive parameter nodes.

In a following third step S120, at least one tessellation factor is provided for each curve segment by means of the tessellation-control shader 1022. The at least one tessellation factor specifies into how many subsegments each curve segment is to be subdivided (tessellated) in the direction of the road contour. The providing of the tessellation factor comprises the calculation of a tessellation factor in the tessellation-control shader 1022 as a function of the curviness of each curve segment. The providing of the tessellation factor consequently depends on the degree of curvature of each partitioned curve segment and may vary between adjacent curve segments within the road segment. If, for example, a curve segment exhibits a high degree of curvature (high curviness), then the tessellation factor provided is larger, this being associated with a finer subdivision of the curve segment in the road-contour direction. In other words, by virtue of a larger tessellation factor a finer tessellation of the curve segment is obtained, by virtue of which the curve contour can be represented graphically on the screen more finely (that is to say, with higher accuracy of detail). The dynamic calculation of the tessellation factor as a function of the curviness of each curve segment will be described in detail in connection with FIG. 6.

In the next step S130, a tessellation pattern is generated by means of the tessellation unit 1023 on the basis of the provided tessellation factor (and further tessellation parameters as described above). For the purpose of parametrising the tessellation, a rectangular unit domain is chosen which is partitioned into a plurality of triangles as a function of the tessellation factor. A partitioning into triangles is undertaken, since the GPU 1020 has been optimised for the representation of triangles, and an arbitrary area to be represented of a graphical object is capable of being represented best by triangles. It will be understood that, instead of triangles, a rectangular or other partitioning could also be undertaken.

In a following step S140, primitives that are capable of being represented on the screen 1030 are then generated on the basis of the generated tessellation pattern and on the basis of the parametrised road contour. If the tessellation pattern consists of a network of triangles, vertices for triangular primitives are calculated on the basis of the parametrisation and on the basis of the pattern, with the aid of which the curve segment to be represented is represented graphically on the screen 1030. Each curve segment represented on the screen 1030 is consequently composed from a plurality of triangular primitives, the number of triangles used determining the fineness of the reproduction of the curve and being determined by the tessellation factor.

In the following, a parametrisation method for providing a parametrisation of the road contours of road segments will now be described in greater detail. The parametrisation is effected on the basis of shape points that have been provided in the cartographic data for each road segment. The parametrisation method can be carried out in connection with the method represented in FIG. 4.

For the parametrisation (generation of a parameter curve) of the road contour on the basis of shape points made available, use will be made in exemplary manner of quadratic B-splines with non-uniformly distributed nodes $t_i$ (in the following, called 'quadratic non-uniform B-splines' or 'quadratic NUBS'). The curve contour of a quadratic NUBS can in this connection be described with the aid of n check points $\vec{d}_i$ (with i=0, ... n−1), the so-called de Boor points, and n+3 nodes, which satisfy the condition $t_0 \leq t_1 \ldots \leq t_{n+2}$. A quadratic NUBS is then a parameter curve $\vec{F}$ defined in the one-dimensional parameter space $[t_2, t_n]$, which maps a parameter value u from the one-dimensional parameter space $[t_2, t_n]$ predetermined by the nodes into a two-dimensional or three-dimensional space $R^k$ (k establishes the spatial dimension) in accordance with the rule of assignment $$\vec{F} : u \mapsto \Sigma_{i=0}^{n-1} N_i^2(u) \cdot \vec{d}_i. \tag{1}$$

where $N_i^2(u)$ represent basis functions of the parametrisation, which have been defined over node intervals in accordance with the following equations $$N_i^2 : u \mapsto \begin{cases} \dfrac{(u - t_i)^2}{(t_{i+2} - t_i) \cdot (t_{i+1} - t_i)} & t_i \leq u < t_{i+1}, \\ \dfrac{(u - t_i) \cdot (t_{i+2} - u)}{(t_{i+2} - t_i) \cdot (t_{i+2} - t_{i+1})} + \dfrac{(u - t_{i+1}) \cdot (t_{i+3} - u)}{(t_{i+3} - t_{i+1}) \cdot (t_{i+2} - t_{i+1})} & t_{i+1} \leq u \leq t_{i+2}, \\ \dfrac{(t_{i+3} - u)^2}{(t_{i+3} - t_{i+1}) \cdot (t_{i+3} - t_{i+2})} & t_{i+2} < u < t_{i+3}, \\ 0 & \text{for all other nodal values} \end{cases} \tag{2}$$

The first derivative of a quadratic NUBS is a linear NUBS and has been defined as follows:

$$\frac{\partial \vec{F}}{\partial u} : u \mapsto \sum_{i=0}^{n-1} N_i^1(u) \cdot \frac{2}{t_{i+3} - t_{i+1}} (\vec{d}_{i+1} - \vec{d}_i), \tag{3}$$

$$N_i^1 : u \mapsto \begin{cases} \dfrac{u - t_i}{t_{i+1} - t_i} & t_i \leq u < t_{i+1}, \\ \dfrac{t_{i+2} - u}{t_{i+2} - t_{i+1}} & t_{i+1} \leq u \leq t_{i+2}, \\ 0 & \text{for all other nodal values} \end{cases}$$

In the following, the calculation of NUBS from a series of shape points will now be described. In connection with the calculation of the quadratic NUBS from shape points it will be assumed that the parametrised curve interpolates the series of the shape points. 'Interpolation' in this connection means that the parameter curve passes exactly through the shape points and does not merely approximate them. But it would also be conceivable to calculate the parameter curve in such a manner that it merely approximates the shape points.

For the purpose of calculating the de Boor points $\vec{d}_i$ and the nodes $t_i$ from the shape points, use is made of a B-spline interpolation technique with chordal parametrisation and with an averaged nodal vector. On the assumption that a road segment consists of n−2 shape points where $\vec{p}_j$, where $0 \leq j \leq n-2$, with the aid of chordal parametrisation firstly parameter values $u_i$ are determined in accordance with the following equations:

$$u_0 = 2 \tag{4}$$

$$u_{n-3} = n - 1$$

$$u_i = u_{i-1} + \frac{n-2}{\Sigma_{j=0}^{n-3} \sqrt{\|\vec{p}_j - \vec{p}_{j+1}\|}} \sqrt{\|\vec{p}_{i-1} - \vec{p}_i\|},$$

with $1 \leq i < n - 3$

From the parameter values $u_i$ the nodes $t_i$ of the parametrisation are then calculated in accordance with the following equations:

$$t_0 = 0 \tag{5}$$

$$t_1 = 1$$

$$t_2 = 2$$

-continued $$t_{i+2} = t_{i+1} + \frac{1}{2}(u_{i-1} + u_i), \text{ with } 1 \leq i < n - 2$$

$$t_n = n$$

$$t_{n+1} = n + 1$$

$$t_{n+2} = n + 2.$$

The node sequence $(t_0, \ldots, t_{n+2})$ is also designated as the nodal vector. The nodal vector calculated in accordance with the above equation is known in the literature as the averaged nodal vector.

With the aid of the nodal vector the linear equation system $$\vec{F}(u_j) \vec{d}_i = \vec{p}_j \tag{6}$$

with $0 \leq j \leq n-2$ for calculating the de Boor points $\vec{d}_i$ can then be set up.

As is immediately evident, the linear equation system has n−2 equations and n unknown de Boor points $\vec{d}_i$. This means that the linear equation system is underdetermined and consequently does not have a unique solution.

The equation system can be determined in more detail by establishing one or more boundary conditions. By way of boundary condition, it is established that the first derivative of the parametrisation at the start-point and end-point satisfies the equations $$\frac{\partial \vec{F}}{\partial u}(u_0) = \frac{1}{2} \cdot (\vec{p}_1 - \vec{p}_0) \qquad (7)$$

$$\frac{\partial \vec{F}}{\partial u}(u_{n-3}) = \frac{1}{2} \cdot (\vec{p}_{n-3} - \vec{p}_{n-4})$$

as a result of which a smooth transition between adjacent segments is obtained. By including the boundary conditions in the preceding equation system, an equation system arises that can be written in a matrix-vector notation as follows:

$$\underbrace{\begin{bmatrix} \frac{\partial N_0^2}{\partial u}(u_0) & \frac{\partial N_1^2}{\partial u}(u_0) & \cdots & \frac{\partial N_{n-2}^2}{\partial u}(u_0) & \frac{\partial N_{n-1}^2}{\partial u}(u_0) \\ N_0^2(u_0) & N_1^2(u_0) & \cdots & N_{n-2}^2(u_0) & N_{n-1}^2(u_0) \\ \vdots & \vdots & \ddots & \vdots & \vdots \\ N_0^2(u_{n-3}) & N_1^2(u_{n-3}) & \cdots & N_{n-2}^2(u_{n-3}) & N_{n-1}^2(u_{n-3}) \\ \frac{\partial N_0^2}{\partial u}(u_{n-3}) & \frac{\partial N_1^2}{\partial u}(u_{n-3}) & \cdots & \frac{\partial N_{n-2}^2}{\partial u}(u_{n-3}) & \frac{\partial N_{n-1}^2}{\partial u}(u_{n-3}) \end{bmatrix}}_{A} \qquad (8)$$

$$\underbrace{\begin{bmatrix} \vec{d}_0 \\ \vec{d}_1 \\ \vdots \\ \vec{d}_{n-2} \\ \vec{d}_{n-1} \end{bmatrix}}_{D} = \underbrace{\begin{bmatrix} \frac{1}{2} \cdot (\vec{p}_1 - \vec{p}_0) \\ \vec{p}_0 \\ \vdots \\ \vec{p}_{n-3} \\ \frac{1}{2} \cdot (\vec{p}_{n-3} - \vec{p}_{n-4}) \end{bmatrix}}_{P}.$$

Since the basis functions $\vec{N}_i^2(u_i)$ have each been locally defined and take the value zero for many parameter values $u_i$ (see Equation 2), many (extra-diagonal) entries of the matrix are zero. Consequently, A represents sparsely filled matrix which can be solved efficiently by standard methods. By solving the above equation system, the de Boor points $\vec{d}_i$ can be ascertained.

Overall, the parametrisation method described herein constitutes a very efficient and resource-sparing method which can be carried out during the operation of a navigation device (that is to say, after uploading of the shape points from the map database). It will be understood that the parametrisation method that has been presented is also suitable, with the aid of NUBS, to run during a compilation of map data. The parametrisations (de Boor points and nodal vector) can then be stored directly in the map database and can be retrieved within the scope of a later graphical representation.

Figure 5:
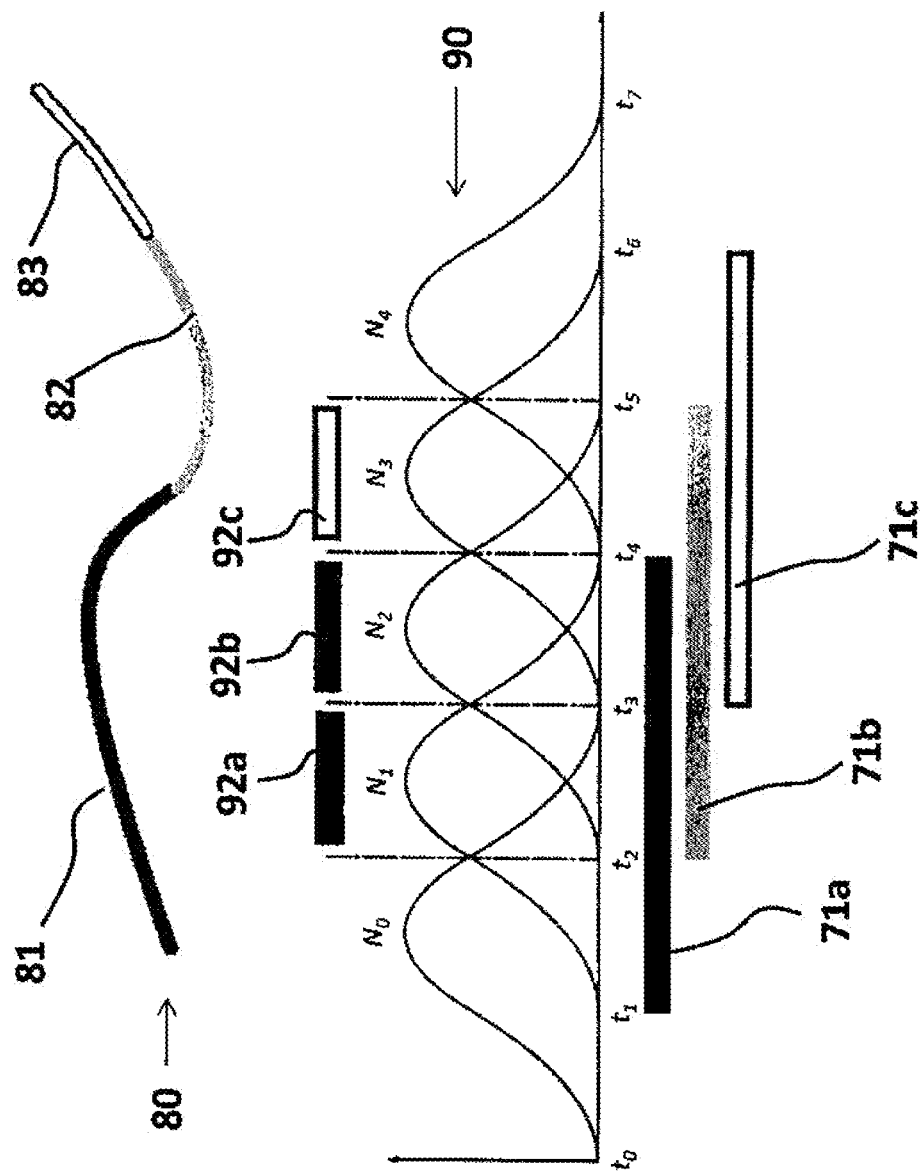
FIG. 5 a representation that shows partitioning of road segments according to a further embodiment.

With the aid of FIG. 5 the piecewise partitioning into curve segments of the parameter curve provided for a road segment will be elucidated further.

The advantage of the parametrisation used herein with the aid of quadratic NUBS is that each quadratic NUBS can be partitioned piecewise into quadratic polynomials. In concrete terms, the NUBS parametrisation of each road segment (with n–2 shape points) can be split up into n–2 B-spline segments (that is to say, curve segments), the curve segment in the interval $[t_i, t_{i+1}]$ being capable of being interpreted as a quadratic polynomial according to the representation $$\vec{F}_i : u \mapsto \tilde{N}_{i-2}^2(u) \cdot \vec{d}_{i-2} + \tilde{N}_{i-1}^2(u) \cdot \vec{d}_{i-1} + \tilde{N}_i^2(u) \cdot \vec{d}_i, \qquad (9)$$

The associated basis functions $N_{i-2}$, $N_{i-1}$, $N_i$ in this connection are capable of being represented in the form $$\tilde{N}_{i-2}^2 : u \mapsto \frac{(t_{i+1} - u)^2}{(t_{i+1} - t_{i-1}) \cdot (t_{i+1} - t_i)}, \qquad (10)$$

$$\tilde{N}_{i-1}^2 : u \mapsto \frac{(u - t_{i-1}) \cdot (t_{i+1} - u)}{(t_{i+1} - t_{i-1}) \cdot (t_{i+1} - t_i)} + \frac{(u - t_i) \cdot (t_{i+2} - u)}{(t_{i+2} - t_i) \cdot (t_{i+1} - t_i)},$$

$$\tilde{N}_i^2 : u \mapsto \frac{(u - t_i)^2}{(t_{i+2} - t_i) \cdot (t_{i+1} - t_i)},$$

where $2 \leq i \leq n+1$. It is to be noted that the piecewise quadratic polynomial representation according to the above equations corresponds to the representation in Equation 2.

FIG. 5 clarifies in exemplary manner the piecewise partitioning of a parameter curve 80 into quadratic polynomials. A curve 80 represented in FIG. 5 shows a detail of a NUBS parametrisation of a road segment that can be partitioned into three mutually independent curve segments 81, 82, 83. Each of the three segments 81, 82, 83 describes a very particular local curve contour of the parameter curve. Whereas segment 81 describes a concave curve contour, segments 82 and 83 each exhibit a convex curve contour.

The graph 90 below the curve 80, represented in FIG. 5, shows the basis functions $N_i$ needed respectively for the curve segments 81, 82, 83 as a function of the nodal values $t_i$. Segment 81 describes the curve contour over parameter interval $[t_2, t_3]$ (marked by bar 92a) and is described by a quadratic polynomial that is completely described with the aid of the de Boor points ($\vec{d}_0$, $\vec{d}_1$, $\vec{d}_2$) and the four nodal values ($t_1$, $t_2$, $t_3$, $t_4$) marked by bar 71a. Equally, curve segments 82 and 83 defined on parameter intervals $[t_3, t_4]$ and $[t_4, t_5]$ (see bars 92b, 92c in graph 90) are described by the three de Boor points ($\vec{d}_1$, $\vec{d}_2$, $\vec{d}_3$) and ($\vec{d}_2$, $\vec{d}_3$, $\vec{d}_4$), respectively, and the nodal values ($t_2$, $t_3$, $t_4$, $t_5$) and ($t_3$, $t_4$, $t_5$, $t_6$), respectively, (bars 71b, 71c). From this representation it follows more generally that a curve parametrised on the basis of n–2 shape points can be partitioned into n–2 mutually independent quadratic polynomials, which for the i-th node interval $[t_i, t_{i+1}]$ can be completely represented by merely three de Boor points ($\vec{d}_{i-2}$, $\vec{d}_{i-1}$, $\vec{d}_i$) and also by a nodal vector with four entries $\vec{s}_i = [t_{i-1}, t_i, t_{i+1}, t_{i+2}]$. Here the advantage becomes evident of the quadratic parametrisation being used in comparison with other curve parametrisations such as, for example, cubic B-splines or Bézier curves, which for segment-wise description need a substantially larger parameter set and hence in the course of processing take up substantially more processor resources and memory resources.

A further advantage of the partitioning, described herein, of the parametrisation consists in the fact that the tessellation (in particular, the degree of tessellation) can be adapted individually to the curviness of the individual curve segments.

For the purpose of individual tessellation and graphical representation of each curve segment, the three de Boor points ($\vec{d}_{i-2}$, $\vec{d}_{i-1}$, $\vec{d}_i$) describing each curve segment and the nodal vector $\vec{s}_i = [t_{i-1}, t_i, t_{i+1}, t_{i+2}]$ are assigned as vertex attributes to a patch. In other words, a patch represents in each instance a partitioned curve segment. The vertex attributes of each patch are loaded into the graphics memory 1020a for the tessellation. As evident from the partitioning in FIG. 5, the vertex attributes of the patches representing successive curve segments partly repeat. For example, for graphical processing of the segments 81, 82, 83 the nodal vectors $\vec{s}_2$, $\vec{s}_3$, $\vec{s}_4$ and the de Boor points $(\vec{d}_0, \vec{d}_1, \vec{d}_2)$, $(\vec{d}_1, \vec{d}_2, \vec{d}_3)$ and $(\vec{d}_2, \vec{d}_3, \vec{d}_4)$ have to be loaded into the GPU 1020. Formulated more generally, for graphical representation of a road segment that was partitioned into n−2 curve segments (patches), a vertex-attribute array V' of the form $$V'=[(\vec{d}_0,\vec{d}_1,\vec{d}_2,\vec{s}_0),(\vec{d}_1,\vec{d}_2,\vec{d}_3,\vec{s}_1),(\vec{d}_1,\vec{d}_2,\vec{d}_3,\vec{s}_1),\ldots,(\vec{d}_{n-3},\vec{d}_{n-2},\vec{d}_{n-3},\vec{s}_{n-3})] \quad (11)$$

is stored in the GPU memory 1020*a*. It is to be noted that vectors $\vec{d}_i$ and $\vec{s}_i$ differ in their dimension. Whereas $\vec{s}_i$ represents a four-dimensional vector, the de Boor points $\vec{d}_i$ form merely two-dimensional or three-dimensional vectors (in the case of 3D parametrisation). Since all the vertex attributes of a patch must have the same dimension, the dimension of the de Boor points $\vec{d}_i$ is adapted to the dimension of the nodal vectors $\vec{s}_i$, by the two-dimensional or three-dimensional de Boor points $\vec{d}_i$ being copied into the vertex-attribute array V', and by the missing entries being filled by zeroes.

As can be deduced from Equation (11), the de Boor points $\vec{d}_i$ and nodal values in the vertex-attribute array are partly repeated three times. In order to avoid an unnecessary demand on and waste of the graphics memory 1020*a*, each NUBS is represented with the aid of the following vertex-attribute array V and index array I.

In the vertex-attribute array V the de Boor points $\vec{d}_i$ and the nodal vectors $\vec{s}_i$ of the curve segments of a road segment are nested together in accordance with the representation $$V=[\vec{d}_0,\vec{d}_1,\vec{d}_2,\vec{s}_0,\vec{d}_3,\vec{s}_1,\vec{d}_4,\vec{s}_2,\vec{d}_5,\vec{s}_3,\ldots,\vec{d}_{n-1},\vec{s}_{n-3}] \quad (12)$$

the assignment of the attributes within the vertex-attribute array complying with the following recursive rule of assignment $$V[0]=\vec{d}_0,V[1]=\vec{d}_1,V[2]=\vec{d}_2,V[3]=\vec{s}_0$$

$$V[2i]=\vec{d}_{i+1},\text{und } V[2i+1]=\vec{s}_{i-1}, \text{ where } 2\le i\le n-1 \quad (13)$$

It is to be noted that in the vertex-attribute array obtained in this way each attribute is stored once only, as a result of which GPU memory resources can be significantly conserved.

In order, on the other hand, to obtain vertex attributes of an individual curve segment from the vertex-attribute array V, the correct entries in the vertex-attribute array V have to be accessed. The access is established via the index array I. According to the above vertex-attribute-array representation V, array entries V[0], V[1], V[2] and V[3] define the first curve segment of a NUBS, entries V[1], V[2], V[4] and V[5] define the following second curve segment, and entries V[2(i−1)], V[2i], V[2(i+1)] and V[2(i+1)+1] with 2≤i<n−1 define each further segment.

The series of indices that is acquired in this way is stored in the index array $$I=[(0,1,2,3);(1,2,4,5);(2,4,6,7);(4,6,8,9);\ldots,(2n-6, 2n-4,2n-2,2n-1)], \quad (14)$$

wherein the brackets are used merely for the purpose of distinguishing the individual patches (or curve segments).

From this, the indices for indexing the vertex-attribute array V can be acquired, whereby, beginning with the first patch, it holds that:

$$I[0]=0,I[1]=1,I[2]=2,I[3]=3 \text{ for the first patch,} \quad (14')$$

$$I[4]=1,I[5]=2,I[6]=4,I[7]=5 \text{ for the second patch,}$$
and $$I[4i]=2(i-1),I[4i+1]=2(i),I[4i+2]=2(i+1),I[4i+3]=2(i+2) \text{ with } 2<=i<=n-1, \text{ for each further patch.}$$

In connection with FIGS. 6 and 7 the graphical representation of NUBS with the aid of the tessellation function implemented in the GPU 1020 will now be described in greater detail.

Figure 6:
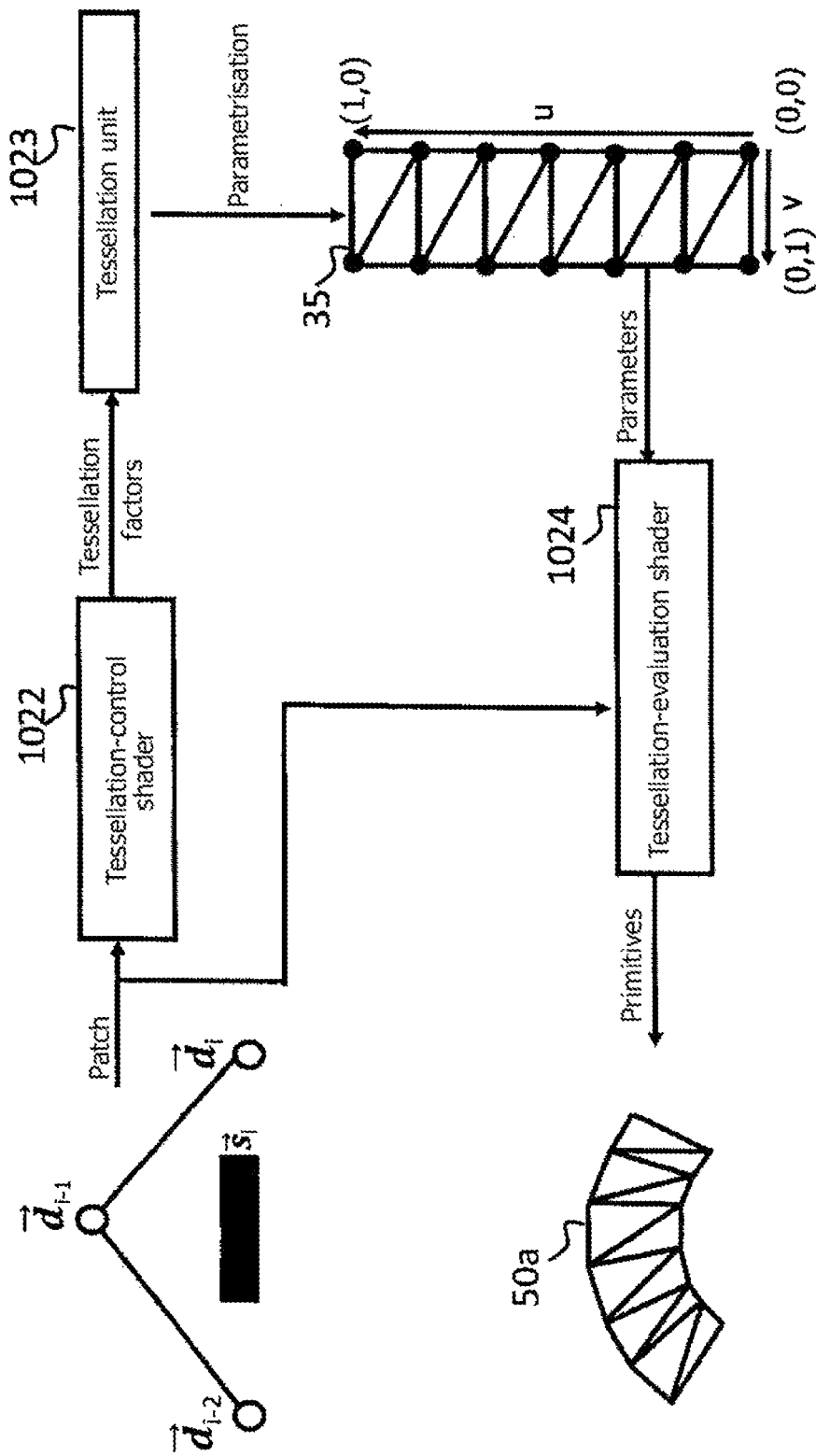
FIG. 6 an embodiment of a parametrisation method for the graphical representation of road segments.

The tessellation function is implemented on the basis of the programmable tessellation-control shader 1022, represented in FIG. 6 and briefly discussed above in connection with FIG. 3, the tessellation unit 1023 and the tessellation-evaluation shader 1024.

The main task of the programmable tessellation-control shader 1022 is the provision of at least one tessellation factor for the tessellation unit 1023. Furthermore, in shader 1022 the type of the tessellation and the domain for the tessellation are established. A rectangular unit domain 35 is established which is described with the aid of (u,v)-coordinates and which has edges that extend along the u-coordinate and along the v-coordinate respectively from 0 to 1. The u-coordinate in this connection points in the direction of a road contour of the parametrised curve segments, whereas the v-coordinate, perpendicular to the u-coordinate, points in the direction of the road width (in conformity with OpenGL, the coordinates are denoted by u and v; it will be understood that the coordinates could also be denoted otherwise). For the coordinates u, v a tessellation factor is respectively provided.

In the following, the provision of a tessellation factor for the coordinates u and v will now be described in greater detail. In this connection let it be mentioned once again that the graphical representation of a road or route as a two-dimensional object with a road contour and with a road width is primarily determined by the road contour (that is to say, by the given curve contour). The width of the road can be assumed by approximation to be constant along the road contour. Correspondingly, a constant value is assigned to the tessellation factor associated with the width (the tessellation factor in the v-direction). Preferentially the value 1 is fixed as tessellation factor in the v-direction, by virtue of which the tessellation unit 1023 generates merely two scan points in the v-direction. Consequently a constant tessellation is undertaken in the v-direction.

In the direction of the road contour—that is to say, in the u-direction—the provision of the tessellation factor is effected as a function of the curviness of each curve segment. In other words, the provision includes an individual calculation of the tessellation factor for each patch. As represented in FIG. 6 (see arrow), each patch, which respectively represents a smallest possible independent extract of the NUBS parametrisation and is capable of being represented uniquely by the three de Boor points $(\vec{d}_{i-2}, \vec{d}_{i-1}, \vec{d}_i)$ and also the nodal vector $\vec{s}_i=(t_{i-1}, t_i, t_{i+1}, t_{i+2})$, is passed to shader 1022.

Figure 7:
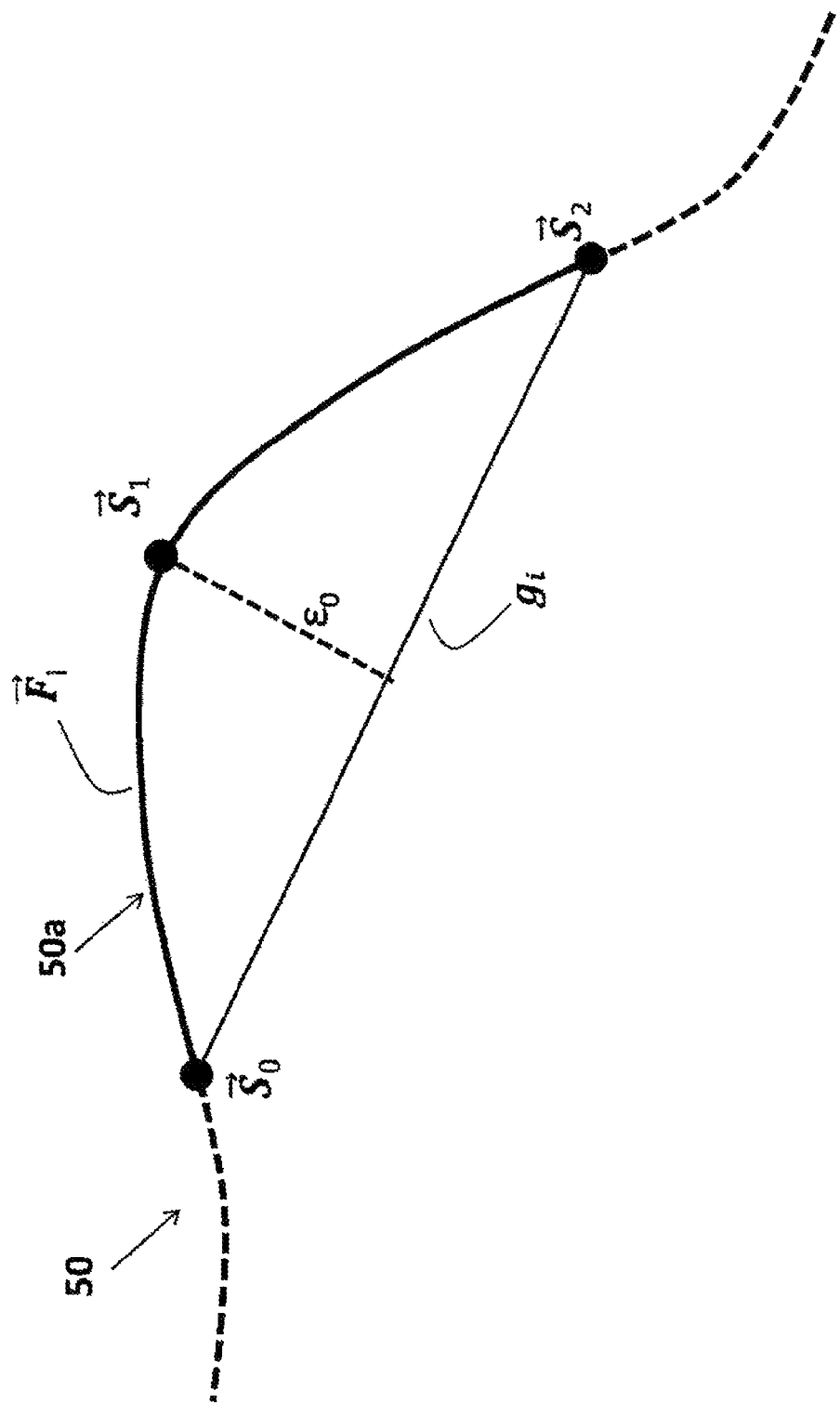
FIG. 7 a model for calculating a tessellation factor according to a further embodiment.

The calculation of the tessellation factor will be elucidated with the aid of the schematic drawing in FIG. 7. FIG. 7 shows in exemplary manner the i-th patch 50*a* of a parametrisation of a road segment 50, the i-th patch 50*a* representing the curve contour over parameter interval [t$_i$, $t_{i+1}$]. Furthermore, FIG. 7 shows the points $\vec{S}_0$, $\vec{S}_1$ and $\vec{S}_2$ drawn upon for the calculation of the tessellation factor, which are obtained by evaluating the parametrisation $F_i$ at parameter values $t_i$, $\frac{1}{2}(t_i+t_{i+1})$ and $t_{i+1}$.

It is to be noted that the points $\vec{S}_0$, $\vec{S}_1$ and $\vec{S}_2$ represented in FIG. 7 and used for the calculation of the tessellation factor are present in screen-space coordinates. For the purpose of calculating the points $\vec{S}_0$, $\vec{S}_1$ and $\vec{S}_2$, the parameter curve $F_i$ is firstly transformed into eye-space coordinates and subsequently evaluated at the curve-start $t_i$, at half-interval distance (that is to say, at $\frac{1}{2}(t_i+t_{i+1})$) and at the curve-end $t_{i+1}$ in accordance with the following equations $$\vec{e}_0 = \vec{F}_i(t_i),$$

$$\vec{e}_2 = \vec{F}_i(t_{i+1})$$

$$\vec{e}_1 = \vec{F}_i(\tfrac{1}{2}(t_i+t_{i+1})) \tag{15}$$

The points $\vec{e}_0$, $\vec{e}_1$, and $\vec{e}_2$ lying on the parameter curve are then projected onto two-dimensional screen-space coordinates $\vec{S}_0$, $\vec{S}_1$, and $\vec{S}_2$. If a three-dimensional parametrisation obtains, the projection is carried out in accordance with the equations $$\vec{n}_i = [e_{i,x}, e_{i,y}, e_{i,z}, 1]^T \cdot P \tag{16}$$

$$\vec{n}_i = n_i / n_{i,w}$$

$$s_i = \left[(n_{i,x}+1)\cdot\frac{w}{2}, (n_{i,y}+1)\frac{h}{2}\right]^T$$

where P represents a 4×4 projection matrix, $n_{i,w}$ denotes the fourth component of vector $\vec{n}_i$, and w and h specify the screen width and screen height. The index i assumes the values (0, 1, 2) in Equation 16, i.e. the index values of the points $\vec{e}_0$, $\vec{e}_1$, and $\vec{e}_2$ to be projected. Incidentally, 'T' stands for 'transposed'.

With the aid of the calculated points $\vec{S}_0$, $\vec{S}_1$, $\vec{S}_2$ a perpendicular spacing $\epsilon_0$ of a straight line $g_i$ connecting the start-point $\vec{S}_0$ and the end-point $\vec{S}_2$ from a midpoint $\vec{S}_1$ is calculated (see FIG. 7). The ascertained spacing $\epsilon_0$ is measured in pixels. In this connection, $\epsilon_0$ is a measure of an error if the curve segment parametrised by $\vec{F}_i$ were to be approximated by the straight line g passing through the start-point $\vec{S}_0$ and end-point $\vec{S}_2$.

It can be shown that by suitable further subdivisions of the curve segment $F_i$ within parameter interval $[t_i, t_{i+1}]$, applying known NUBS subdivision algorithms, the error continuously decreases, whereby after m subdivisions an error value for the deviation of the tessellated curve can be estimated in accordance with the equation $$\epsilon = (\epsilon_0^2)^m \tag{17}$$

The curve segment $\vec{F}_i$ in this case is to be subdivided until such time as a predetermined error $\delta$ is fallen short of, i.e. until the inequality $$(\epsilon_0^2)^m < \delta \tag{18}$$

has been satisfied, where $\delta$ represents a pixel value. The value $\delta$ may, for example, correspond to a half pixel in the screen space.

After m subdivisions, for a patch a total of $2^{2m+1}+1$ scan points in the direction of the road contour (that is to say, for the u-coordinate) are generated. Furthermore, $$u_{tess} = 2^{2m+1} \tag{19}$$

subdivisions in the direction of the curve contour are generated. In this connection, $u_{tess}$ is designated as tessellation factor and specifies the number of subdivisions for the curve segment $\vec{F}_i$ under consideration in the direction of the curve contour.

By taking the logarithm of Equation (19), it follows that $$m = \log_2(u_{tess}) - 1. \tag{20}$$

By substituting m in Equation (18) with the aid of Equation (20), an estimation for the tessellation factor $u_{tess}$ in accordance with the equation $$v_{tess} = 2\frac{\log(\delta)}{\log(\epsilon 0)} \tag{21}$$

can be obtained. According to Equation (21), the tessellation factor may also assume a rational value. Since modern GPUs also support rational tessellation factors, such values can be drawn upon for the purpose of tessellation, by virtue of which a seamless transition between tessellation factors of consecutive patches is possible.

Overall, by means of Equation (21) a tessellation factor for each curve segment can be estimated individually from the two parameters $\epsilon_0$ and $\delta$, where $\delta$ represents a permanently predetermined value, and where $\epsilon_0$ is calculated from the three evaluated and transformed points $\vec{S}_0$, $\vec{S}_1$, and $\vec{S}_2$. With the estimation given in Equation (21), the tessellation factor for each curve segment can be determined dynamically, without a resource-consuming iterative calculation method for each patch having to be carried out individually for this purpose.

Back to FIG. 6: Once the tessellation factors for both coordinates (u,v) of the unit domain have been established by the tessellation-control shader 1022, these factors are supplied to the tessellation unit 1023. As represented in FIG. 6, two scan points in the v-direction corresponding to the tessellation factor $v_{tess}=1$ are provided for the unit domain provided, whereas in the u-direction $2^{2m+1}+1$ scan points corresponding to the tessellation factor $u_{tess}=2^{2m+1}$ are generated.

In the tessellation pattern shown in FIG. 5 the scan points have been represented as nodes along the two coordinates (u, v). On the condition that the unit domain is tessellated into triangular areas (this can be established by the tessellation parameters), with the aid of the nodes a tessellation pattern can be generated that represents the unit domain as a network with $2^{2m+1}+1$ triangles. For the exemplary case shown in FIG. 6, the tessellation factor is $u_{tess}=6$, the rectangular unit domain having been subdivided into 6 subsegments in the u-direction and being constructed from a total of 12 triangles.

Lastly, the programmable tessellation-evaluation shader 1024 is configured to generate for each patch, on the basis of the provided tessellation pattern (that is to say, on the basis of the calculated scan points and on the basis of the type of the connection of the scan points) and on the basis of the vertex attributes contained in the patch (i.e. the de Boor points, nodal vector), primitives that are capable of being represented graphically, with the aid of which the curve contour of each patch can be represented on the screen 1030.

For the purpose of generating the primitives (in the present case, triangles) that are capable of being represented graphically, the vertex positions of the primitives have to be calculated. For the patch 50a, which defines the curve contour of a road segment with the aid of the (transformed) parameter function $F_i$ in the parameter domain $[t_i, t_{i+1}]$, for the purpose of generating the vertex positions of the triangular primitives along the direction of the curve contour the parametrisation $F_i(u'_0)$ with the parameter values $$u'_0 = (1-u_0) \cdot t_i + u_0 \cdot t_{i+1} \quad (22)$$

is evaluated, wherein $u_0$ can assume the scan points in the interval $[0,1]$ that have been provided in the tessellation pattern. Consequently, in the interval $[t_i, t_{i+1}]$ the parametrisation $\vec{F}_i(u'_0)$ with the subdivision unit predetermined in the tessellation pattern is evaluated. This means that for a high tessellation factor with many scan points $u_0$ many vertices $\vec{F}_i(u'_0)$ in the interval $[t_i, t_{i+1}]$ are calculated. Since the vertices $\vec{F}_i(u'_0)$ represent the vertices of the triangular primitives to be generated, and since the edges of the triangles have been represented by straight lines connecting linear adjacent vertices (linear interpolation between adjacent vertices), it becomes clear that a curve segment with great curviness can be represented sufficiently well with the aid of triangular primitives only when the vertices provided along the direction of the curve contour in the interval $[t_i, t_{i+1}]$ follow one another as closely as possible. This is obtained by a high tessellation factor.

Since, furthermore, roads are represented on the screen 1030 as two-dimensional graphical objects and not only as one-dimensional curves, for each parameter value $u'_0$ a vertex is also generated that has been displaced with respect to the vertex $\vec{F}(u'_0)$ along the normal unit vector $\vec{b}/|b|$, which is perpendicular to $\vec{F}_i(u'_0)$, in accordance with the representation $$\vec{F}_i(u'_0) + \left(v_0 - \frac{1}{2}\right) \cdot \lambda \frac{\vec{b}}{\|\vec{b}\|}. \quad (23)$$

In this connection, $v_0$ takes the values 0 or 1. $\lambda$ is a dynamically adaptable parameter, with the aid of which the thickness, to be represented, of the road or route can be scaled. The normal vector b is calculated in known manner in accordance with the gradient $$\vec{b} = \frac{\partial \vec{F}(u'_0)}{\partial u} \quad (24)$$

The vertices to be output by the tessellation-evaluation shader 1024 in the direction of the road contour and perpendicular to the road contour consequently result in accordance with Equation 23. From the vertices, the triangular primitives that are capable of being represented graphically can then be constructed for the patch 50a, as represented in FIG. 6.

Consequently, each curve segment can be represented graphically on the screen 1030 by a set of triangles. Or, in other words, each curve segment can be partitioned into a set of triangular primitives that are capable of being represented. In particular, the partitioning of each curve segment can be set individually and can be adapted for each curve segment in accordance with the curviness (and/or of the viewing angle). Curve segments that are to be represented on the screen 1030 with strong curvatures are tessellated more intensely and are consequently partitioned into a finer network of triangular primitives, whereas for curve segments with low curvature a coarser tessellation can be provided. In this way it is ensured that each curve segment appears on the screen 1030 as a curve that is as smooth as possible, irrespective of its curviness, as a result of which the representation of road segments, road networks and routes on the screen 1030 is substantially improved. In particular, through the dynamic adaptation of the tessellation it is ensured that a graphical representation is obtained that is as optimal and efficient as possible. In particular, a realistic representation of road segments can be obtained, without having to evaluate a large number of shape points for this purpose.

Furthermore, by virtue of the parametrisation, partitioning of the road contours and the organisation of the data in the graphics memory, all described herein, it is ensured that computing resources and memory resources are taken up as efficiently and sparingly as possible. In particular, with the parametrisation described herein a parametrisation of road segments on the basis of shape points is possible at the time of the graphical representation (on the fly).

The invention claimed is:

1. A method for graphical representation of road segments, wherein cartographic data that describe at least one two-dimensional or three-dimensional road contour of the road segment are assigned to each road segment, the method performed by a graphics module and comprising the following steps:
    providing of a parametrisation that describes the road contour of a road segment;
    piecewise partitioning the parametrisation of the road segment into mutually independent curve segments;
    providing at least one tessellation factor for each curve segment, the at least one tessellation factor specifying into how many subsegments each curve segment is to be subdivided in the direction of the road contour;
    generating a tessellation pattern for each curve segment based on the at least one tessellation factor;
    generating primitives on the basis of the generated tessellation pattern and on the basis of the parametrised road contour; and
    displaying the generated primitives on a screen.

2. The method according to claim 1, wherein a road segment is composed and represented graphically from the primitives generated for the curve segments.

3. The method according to claim 1, wherein the curve contour of each curve segment is linearly interpolated by the generated primitives.

4. The method according to claim 1, wherein a tessellation factor assigned to the road contour is calculated at least based on a curve contour of the curve segment.

5. The method according to claim 4, wherein for the purpose of calculating the tessellation factor assigned to the road contour the curve contour, projected onto a screen, of the curve segment is drawn upon.

6. The method according to claim 4, wherein a tessellation factor assigned to the road contour for a curve segment $\vec{F}_i$ parametrised in a parameter interval $[t_1, t_{i+1}]$ is calculated in accordance with the equation $u_{tess} = 2 \times \log(\delta)/\log(\epsilon_0)$, where $u_{tess}$ denotes the tessellation factor, $\delta$ specifies a preset accuracy value, and where $\epsilon_0$ is calculated from a start-point $\vec{S}_0 = F(t_i)$, an end-point $\vec{S}_s = F_i(t_{i+1})$ and a point $\vec{S}_1 = \vec{F}_i(\frac{1}{2}(t_i+t_{i+1}))$ of the parametrisation $\vec{F}_i$, by calculating a spacing of a straight line connecting the start-point $\vec{S}_1$ and end-point $\vec{S}_2$ from point $\vec{S}_1$.

7. The method according to claim 1, wherein the tessellation factor assigned to the road contour is furthermore calculated based on a field of view for the curve segments to be represented.

8. The method according to claim 1, further comprising providing a further tessellation factor that has been assigned to a road width perpendicular to the direction of the road contour.

9. The method according to claim 8, wherein the tessellation factor assigned to the road width assumes a constant value.

10. The method according to claim 1, wherein the step of generating a tessellation pattern comprises:
   generating scan points based on the at least one tessellation factor provided, the scan points specifying the degree of subdivision of the curve segment along the road contour.

11. The method according to claim 10, wherein the step of generating primitives comprises:
   implementing a coordinate transformation that maps the parametrisation of the road contour onto coordinates of the screen space;
   calculating vertices, by evaluating the transformed parametrisation at the scan points along the road contour; and
   generating primitives on the basis of the generated vertices.

12. The method according to claim 11, wherein the step of calculating vertices further comprises:
   calculating vertices, by evaluating the transformed parametrisation at the scan points along the road contour, and by evaluating the vertices provided for the road width along a normal vector which lies in a screen plane and is perpendicular to the road contour.

13. The method according to claim 1, wherein the parametrisation is calculated on the basis of previously stored shape points marking the road contour.

14. The method according to claim 13, wherein the parametrisation is calculated by interpolating the shape points.

15. The method according to claim 13, wherein the parametrisation is calculated on the fly on the basis of the shape points.

16. The method according to claim 1, wherein the road contour of each road segment is parametrised by a quadratic B-spline that is described via non-uniformly distributed nodal points and de Boor points.

17. The method according to claim 16, wherein each non-uniform B-spline of a road segment is partitioned into mutually independent quadratic polynomials, each polynomial being defined over a node interval $I_i = [t_i; t_{i+1}]$ and being described by a nodal vector $\vec{s}_i = t_{i-1}, t_i, t_{i+2}, t_{i+2})$ and three de Boor points $\vec{d}_{i-2}, \vec{d}_{i-1}, \vec{d}_i$.

18. The method according to claim 17, wherein each non-uniform B-spline of a road segment is described with the aid of an index array and with the aid of a vertex-attribute array comprising the nodal vectors and de Boor points.

19. The method according to claim 18, wherein the vertex-attribute array comprises the nodal vectors and the de Boor points for all the quadratic polynomials of the road segment to be represented without recursive repetition of nodal vectors and de Boor points in accordance with the arrangement $$V = [\vec{d}_0, \vec{d}_1, \vec{d}_2, \vec{s}_0, \vec{d}_3, \vec{s}_1, \vec{d}_4, \vec{s}_2, \vec{d}_5, \vec{s}_3, \ldots, \vec{d}_{n-1}, \vec{s}_{n-3}]$$

where n is the number of nodes.

20. The method according to claim 18, wherein the index array comprises indices of the vertex-attribute-array entries in accordance with the arrangement $$I = [(0,1,2,3); (1,2,4,5); (2,4,6,7); (4,6,8,9); \ldots, (2n-6, 2n-4, 2n-2, 2n-1)],$$

where n is the number of nodes.

21. A non-transitory computer-readable recording medium storing program code for implementing the method according to claim 1 when the program code is executed on a computer device.

22. A navigation device comprising:
   a graphics module for graphical representation of road segments by employing hardware tessellation, wherein cartographic data that de-scribe at least one two-dimensional or three-dimensional road contour of each road segment are assigned to each road segment, the graphics module comprising:
      a unit that is configured to provide a parametrisation that describes the road contour of a road segment,
      a unit that is configured to partition the parametrisation of the road segment into mutually independent curve segments,
      a unit that is configured to provide at least one tessellation factor for each curve segment, the at least one tessellation factor specifying into how many subsegments each curve segment is to be subdivided in the direction of the road contour,
      a tessellation unit that is configured to generate a tessellation pattern for each curve segment based on the at least one tessellation factor, and
      a unit that is configured to generate primitives on the basis of the generated tessellation pattern and on the basis of the parametrised road contour; and
   a screen that is configured to display the generated primitives.

23. A graphics module for graphical representation of road segments by employing hardware tessellation, wherein cartographic data that describe at least one two-dimensional or three-dimensional road contour of each road segment are assigned to each road segment, the graphics module comprising:
   a unit that is configured to provide a parametrisation that describes the road contour of a road segment;
   a unit that is configured to partition the parametrisation of the road segment into mutually independent curve segments;
   a unit that is configured to provide at least one tessellation factor for each curve segment, the at least one tessellation factor specifying into how many subsegments each curve segment is to be subdivided in the direction of the road contour;
   a tessellation unit that is configured to generate a tessellation pattern for each curve segment based on the at least one tessellation factor; and
   a unit that is configured to generate primitives on the basis of the generated tessellation pattern and on the basis of the parametrised road contour.

24. The graphics module according to claim 23, further comprising a memory unit that is configured to store at least one index array and one vertex-attribute array, the vertex-attribute array comprising parameter data for the parametrisation of a road segment.

* * * * *